United States Patent
Gupta

(10) Patent No.: US 11,787,294 B1
(45) Date of Patent: Oct. 17, 2023

(54) SYSTEM TO FACILITATE CONTROL OF AUTONOMOUS MOBILE DEVICE BY EXTERNAL FORCE

(71) Applicant: AMAZON TECHNOLOGIES, INC., Seattle, WA (US)

(72) Inventor: Abhay Gupta, Santa Clara, CA (US)

(73) Assignee: AMAZON TECHNOLOGIES, INC, Seattle, WA (US)

( * ) Notice: Subject to any disclaimer, the term of this patent is extended or adjusted under 35 U.S.C. 154(b) by 354 days.

(21) Appl. No.: 17/141,466

(22) Filed: Jan. 5, 2021

(51) Int. Cl.
| | |
|---|---|
| B60L 15/20 | (2006.01) |
| G05D 1/00 | (2006.01) |
| B60K 1/02 | (2006.01) |
| G05D 1/02 | (2020.01) |
| H02P 5/50 | (2016.01) |

(52) U.S. Cl.
CPC .......... *B60L 15/2009* (2013.01); *B60K 1/02* (2013.01); *G05D 1/0088* (2013.01); *G05D 1/0212* (2013.01); *H02P 5/50* (2013.01); *B60L 2240/10* (2013.01); *B60L 2240/423* (2013.01); *B60L 2240/429* (2013.01); *G05D 1/0231* (2013.01); *G05D 1/0257* (2013.01)

(58) Field of Classification Search
CPC ............ B60L 15/2009; B60L 2240/10; B60L 2240/423; B60L 2240/429; G05D 1/0088; G05D 1/0212; G05D 1/0231; G05D 1/0257; B60K 1/02
USPC .......................................................... 701/22
See application file for complete search history.

(56) References Cited

U.S. PATENT DOCUMENTS

| | | | |
|---|---|---|---|
| 7,962,256 B2 * | 6/2011 | Stevens ................ | B62K 11/007 180/65.245 |
| 11,610,684 B2 * | 3/2023 | Ben Gad ............... | A61B 5/7267 |
| 2016/0299502 A1 * | 10/2016 | Chamberlain ....... | G05D 1/0088 |
| 2017/0190335 A1 * | 7/2017 | Gillett .................... | B62K 17/00 |
| 2017/0281440 A1 * | 10/2017 | Puvogel ............... | A61G 7/0527 |
| 2018/0127038 A1 * | 5/2018 | Gerhardt .............. | B62D 57/024 |
| 2019/0179307 A1 * | 6/2019 | Anderson ........... | A47L 11/4011 |
| 2020/0207250 A1 * | 7/2020 | Jarvis ..................... | G06Q 50/28 |
| 2021/0070339 A1 * | 3/2021 | Delgatty ................. | B62B 3/008 |
| 2022/0019213 A1 * | 1/2022 | Haghighat Kashani ..................... B25J 11/0015 |

\* cited by examiner

*Primary Examiner* — Yazan A Soofi
(74) *Attorney, Agent, or Firm* — Lindauer Law, PLLC

(57) ABSTRACT

An autonomous mobile device (AMD) operating in a first mode moves within a physical space to perform various tasks such as displaying information on a screen, following a user, and so forth. The first mode may involve the AMD moving or maintaining a particular pose. While the AMD is in the first mode, a user may apply an external force to the AMD to reposition the AMD to a desired pose. Application of this external force on the AMD is detected and results in the AMD transitioning to a second mode in which the AMD may be repositioned. While in the second mode, the user may reposition the AMD. The second mode may constrain the magnitude of the resulting movement, preventing the user from moving the AMD too quickly which could damage components within the AMD. Once the external force ceases, the AMD may transition back to the first mode.

20 Claims, 7 Drawing Sheets

SYSTEM TO FACILITATE CONTROL OF AUTONOMOUS MOBILE DEVICE BY EXTERNAL FORCE

COMPUTER PROGRAM LISTING

A computer program listing is submitted with this disclosure and is hereby incorporated by reference for all that it contains.

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
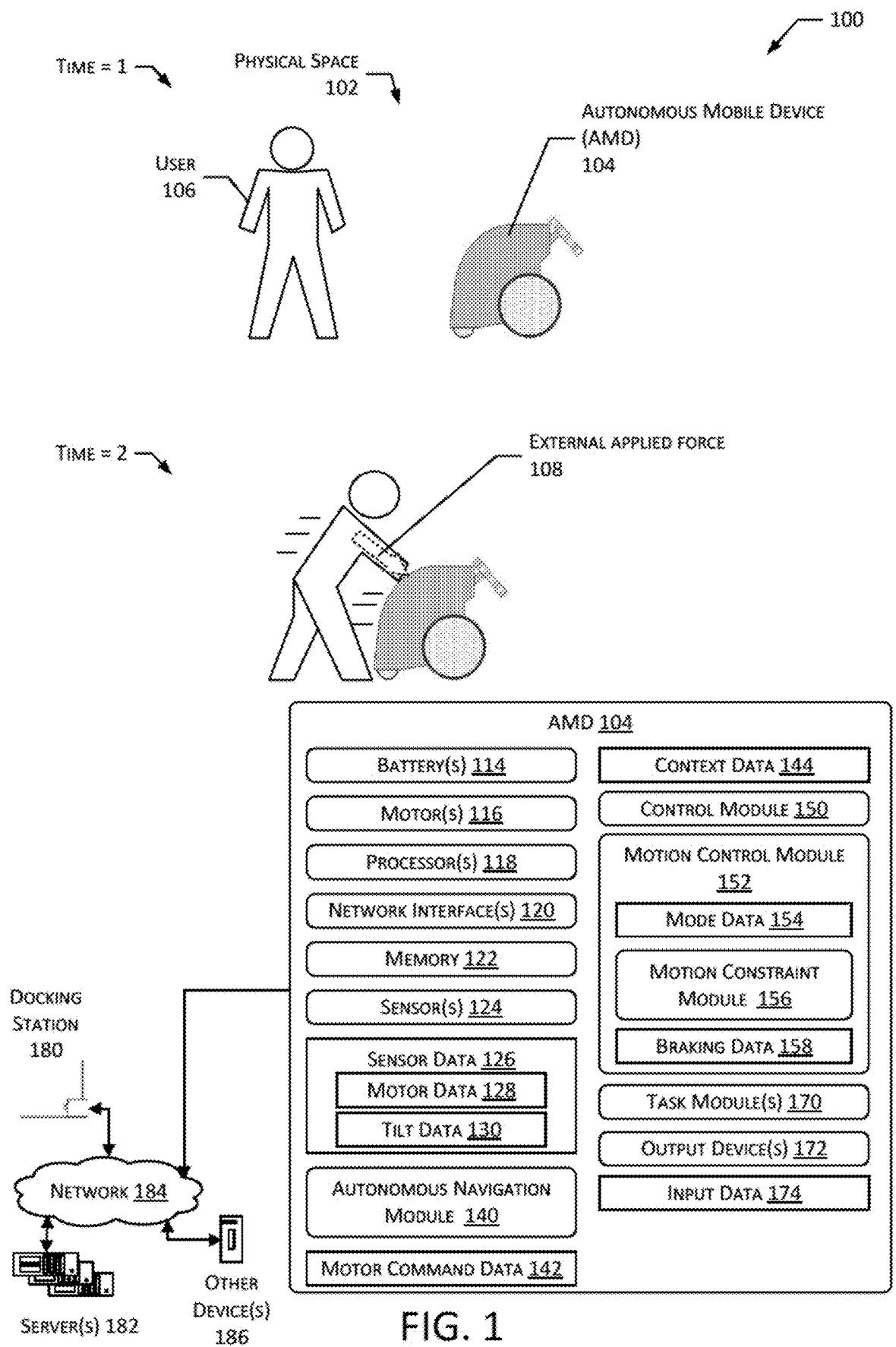
FIG. 1 illustrates a motion control system allowing a user to reposition an autonomous mobile device (AMD) in a physical space, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD), such as a robot, is capable of autonomous movement from one location in a physical space to another location without being controlled by a user. The AMD may perform tasks that involve displaying information, accepting input, carrying objects, and so forth. A user may interact with the AMD.

The AMD moves in the physical space. For example, the AMD may translate or rotate. The AMD may include one or more moveable portions mounted to a chassis of the AMD. For example, a moveable portion may comprise a display and a camera that may pan and tilt relative to the chassis to point the display and camera towards a user.

The AMD may move autonomously to a particular pose. The pose is a particular location in the physical space, and a particular orientation with respect to the physical space. For example, the AMD may autonomously move to a particular location in the kitchen and turn to point towards the user that is closest to it.

While the AMD is waiting for a task, or performing a task, it may perform various autonomous navigation functions. For example, these autonomous navigation functions may involve the AMD moving from a first pose to a second pose without human intervention. In another example, the autonomous navigation functions may also involve the AMD holding still in a particular pose, awaiting a next task.

For a variety of reasons, the user may wish to change the pose of the AMD. For example, the user may wish to point the entire AMD, or a portion thereof such as a display, in a particular direction. In another example, the user may wish to move the AMD to a different location in the physical space.

Traditionally, until instructions to change the pose have been received, the autonomous navigation functions may attempt to maintain a specified pose. If the user wishes to move the AMD, the user would need to issue a command to the AMD. For example, the user would instruct the autonomous navigation system to rotate the AMD by a specified number of degrees, move one meter forward, and so forth. However, these additional steps may result in a poor user experience, impair the user's ability to use the physical space, and so forth. For example, if the AMD is blocking the user's path, it would be time consuming to stop, issue the command to move, and then wait for the AMD to process the command and autonomously move.

Described in this disclosure is a motion control module that facilitates control of the AMD by an external force. The motion control module dynamically transitions between a first mode that allows autonomous movement of the AMD and a second mode that allows the AMD, or a portion thereof, to be repositioned by the user by providing an external applied force to the AMD. While in the second mode, motion of the AMD or portion thereof is constrained. For example, the AMD may apply braking to prevent the AMD from being pushed too fast. Once the user stops providing the external applied force, the AMD transitions from the second mode to the first mode.

The motion control module may determine presence of the external applied force based on sensor data. In one implementation, a motor current sensor may provide data indicative of a current generated in the motor as a result of movement. For example, pushing the AMD may cause a wheel to rotate, causing a motor attached to the wheel to generate an electrical current. If the detected motor current exceeds a threshold value while the motor is not being operated, an external applied force may be deemed to occur. If the motor is being operated, a detected motor current that varies from an expected current value may be used to determine the presence of the external applied force.

The motion control module may be implemented as a microcontroller that includes, or is in communication with, a controller for one or more motors. This allows the mode of operation to be determined with very low latency, improving safety of the user and the overall user experience. A user is able to quickly and easily reposition the AMD to a different pose, without the need to issue an explicit command. Once the user has finished and the external applied force ceases, the AMD resumes the ability to move autonomously.

Illustrative System

FIG. 1 illustrates a system 100 in a physical space 102 that includes an autonomous mobile device (AMD) 104 with a motion control system allowing a user 106 to reposition the AMD 104 by providing an external applied force 108, according to some implementations. The external applied force 108 may comprise a push, a pull, and so forth.

The AMD 104 may move through the physical space 102. The motion of the AMD 104 may be described as a trajectory. In some implementations the trajectory may comprise a series of poses. Each pose may be indicative of a particular location with respect to a plurality of orthogonal axes and rotation with respect to individual ones of the axes. For example, the pose may comprise six dimensional (6D) information indicative of coordinates in three-dimensional space with respect to a designated origin, and rotation with respect to each of the three axes.

The AMD 104 may include battery(s) 114 to provide electrical power for operation of the AMD 104. The battery 114 may be rechargeable, allowing it to store electrical energy obtained from an external source. In other implementations a wireless power receiver may be used to provide power for operation of the AMD 104, recharge the battery 114, and so forth.

One or more motors 116 or other actuators enable the AMD 104 to move from one location in the physical space 102 to another. For example, a motor 116 may be used to drive a wheel attached to a chassis of the AMD 104, which causes the AMD 104 to move. The AMD 104 may turn, move forward, move backward, and so forth. In another example, actuators may move legs allowing the AMD 104 to walk. Other motors 116 may be used to move at least a portion of the AMD 104. For example, one or more motors 116 may be used to pan and tilt a moveable part that includes a display device, camera, and so forth.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more network interfaces 120. The network interfaces 120 may include devices to connect to personal area networks (PANS), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth.

The AMD 104 includes one or more memories 122. The memory 122 may comprise one or more non-transitory computer-readable storage media (CRSM).

The AMD 104 may include one or more sensors 124. For example, the sensors 124 may include motor sensors, accelerometers, cameras, and so forth. The sensors 124 may generate sensor data 126. For example, motor sensors may generate motor data 128, accelerometers may provide tilt data 130, and so forth. The sensors 124 are discussed in more detail with regard to FIG. 3.

An autonomous navigation module 140 provides the AMD 104 with the ability to navigate within the physical space 102 without real-time human interaction. The autonomous navigation module 140 may implement, or operate in conjunction with, a mapping module to determine an occupancy map or other representation of the physical space 102. The autonomous navigation module 140 is discussed in more detail with regard to FIG. 2.

The AMD 104 autonomous navigation module 140 may generate path plan data that is indicative of a path through the physical space 102 from the current location to a destination location. The AMD 104 may then begin moving along the path. While moving along the path, the AMD 104 may assess the physical space 102 and update or change the path as appropriate. For example, if an obstacle appears in the path, the mapping module may determine the presence of the obstacle as represented in the occupancy map. The now updated occupancy map may then be used to plan an alternative path to the destination location.

During operation of the AMD 104, motor command data 142 may be generated. The motor command data 142 is indicative of one or more motor commands or other instructions to control the one or more motors 116.

Context data 144 may be determined by one or more of the autonomous navigation module 140, a task module 170, or other module. The context data 144 may be indicative of the physical space 102, users 106 in the physical space 102, state of the AMD 104, and so forth. The context data 144 may be based on sensor data 126. For example, based on sensor data 126, the context data 144 may be indicative of a presence of a person in the vicinity of the AMD 104, count of persons in the vicinity of the AMD 104, presence of a pet in the vicinity of the AMD 104, and so forth. In some implementations the vicinity may be specified as a room, distance from the AMD 104, and so forth. In another example, the context data 144 may be indicative of a type of location associated with the physical space 102. Continuing the example, the context data 144 may indicate that the AMD 104 is currently located in an "office", "residence", "factory", "retail store", and so forth. In yet another example, the context data 144 may indicate a type of task in progress. Continuing the example, the task module 170 may indicate that a task type such as "follow user", "video call", "sentry", "battery charge", and so forth is in progress.

A control module 150 may comprise circuitry to control the operation of the one or more motors 116. For example, the control module 150 may comprise circuitry to drive a left motor 116 and a right motor 116 of the AMD 104 to allow the AMD 104 to change pose. In another example, the control module 150 may drive a pan/tilt motor 116 to allow a portion of the AMD 104, such as a display panel, to change orientation relative to a chassis of the AMD 104. Operation of the control module 150 may be responsive to output from the motion control module 152.

The motion control module 152 determines mode data 154. Operation of the control module 150 may be determined responsive to the mode data 154. In one implementation, the mode data 154 may be indicative of a first mode or second mode. In this illustration, the AMD 104 is depicted at a first time t=1 and a second time t=2. At the first time t=1, the AMD 104 is not moving and may be in the first mode. At the second time t=2, the user 106 is applying the external applied force 108 to the AMD 104, and the AMD 104 is in the second mode.

The first mode may be a "tracking mode" in which the AMD 104 moves responsive to the motor command data 142 provided by the autonomous navigation module 140 or another module. For example, the AMD 104 is in the first mode as it moves autonomously through the physical space 102. The AMD 104 may cease moving, while remaining in the first mode. For example, the AMD 104 may reach a specified destination pose, stop moving, and wait for further instructions. Even if motionless, while in the first mode, the AMD 104 would typically attempt to maintain the specified destination pose. The AMD 104 may attempt to maintain the specified destination pose by applying braking force to prevent any change in pose, moving back to the specified destination pose if disturbed, and so forth.

In comparison, the second mode may be a "compliance mode" in which the AMD 104 can be moved to another pose, responsive to an external applied force 108. While in the second mode, the AMD 104 may not move responsive to the motor command data 142 from the autonomous navigation module 140. While in the second mode, some braking force may be applied to avoid freewheeling of the AMD 104.

While the first mode substantially resists movement of the AMD 104 responsive to the external applied force 108 and may permit the AMD 104 to attempt to return to a specified pose, the second mode permits some movement. The movement permitted by the second mode may include some braking force as well as additional braking force to constrain movement. For example, while in the second mode, the user 106 may exert the external applied force 108 to push the AMD 104 from the specified destination pose to a second pose. This may include a linear movement of the AMD 104, rotation, or a combination thereof.

The motion control module 152 determines the mode data 154 based on input, such as the motor data 128, tilt data 130, or other sensor data 126. In one implementation, a motor current sensor may measure electrical current produced by a motor 116 that is not being driven (motor current). For example, if the external applied force 108 moves the AMD 104, that movement will rotate a wheel attached to the motor 116. That rotation results in an electrical current that can be measured by the motor current sensor. The faster the rotation, the greater the current. If the motor current exceeds a threshold value, a determination may be made that the external applied force 108 is present. Responsive to this determination, the motion control module 152 may transition from the first mode to the second mode. The tilt data 130 may also be used by the motion control module 152 to avoid erroneous transitions between the first mode and the second mode due to gravity. For example, if the AMD 104 is stopped on a ramp, gravity will tend to pull the AMD 104 down the ramp. This pull is compensated for, allowing for detection of the external applied force 108 provided by the user 106. Operation of the motion control module 152 is discussed in more detail with regard to FIGS. 6 and 7.

The motion control module 152 may include a motion constraint module 156. The motion constraint module 156 may determine braking data 158. The braking data 158 may comprise information indicative of a braking force to apply to one or more motors 116 to constrain motion of the AMD 104, or a portion thereof. The braking data 158 may be indicative of an initial level of braking force to be applied. For example, some braking may always be applied to prevent the motors 116 from freewheeling. The motion constraint module 156 may attempt to limit movement while in the second mode. For example, the motion constraint module 156 many determine braking data 158 that indicates increasing braking force to be applied by the motor(s) 116 as the speed of the AMD 104 increases due to the external applied force 108. For example, the faster the AMD 104 is pushed, the more braking torque will be applied to the motors 116 to slow the AMD 104 down. The constraint on movement may be implemented to avoid damage to the AMD 104, reduce the likelihood of damage to other users 106, and so forth. Operation of the motion constraint module 156 is discussed in more detail with regard to FIGS. 6 and 7.

The AMD 104 may utilize one or more task modules 170. The task module 170 comprises instructions that, when executed, provide one or more functions. The task modules 170 may perform functions such as finding a user 106, following a user 106, presenting output on output devices 172 of the AMD 104, performing sentry tasks by moving the AMD 104 through the physical space 102 to determine the presence of unauthorized people, and so forth.

Modules described herein, such as the autonomous navigation module 140, may provide various processing functions such as de-noising, filtering, and so forth. Processing of sensor data 126, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 126. In still another implementation, functions such as those in the Machine Vision Toolbox (MVTB) available using MATLAB as developed by MathWorks, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 126 or other data. For example, the ANN may be trained using a supervised learning algorithm such that object identifiers are associated with images of particular objects within training images provided to the ANN. Once trained, the ANN may be provided with the sensor data 126 and produce output indicative of the object identifier.

The AMD 104 includes one or more output devices 172, such as one or more of a motor 116, light, speaker, display, projector, printer, and so forth. The one or more output devices 172 may be used to provide output during operation of the AMD 104. The output devices 172 are discussed in more detail with regard to FIG. 3.

During operation, the AMD 104 may determine input data 174. The input data 174 may include or be based at least in part on sensor data 126 from the sensors 124 onboard the AMD 104. In one implementation, a speech processing module may process raw audio data obtained by a microphone on the AMD 104 and produce input data 174. For example, the user 106 may say "robot, come here" which may produce input data 174 "come here". In another implementation, the input data 174 may comprise information such as a command provided by another computing device, such as a smartphone or tablet computer.

The AMD 104 may use the network interfaces 120 to connect to a network 184. For example, the network 184 may comprise a wireless local area network, that in turn is connected to a wide area network such as the Internet.

A docking station 180 may also be connected to the network 184. For example, the docking station 180 may be configured to connect to the wireless local area network 184 such that the docking station 180 and the AMD 104 may communicate. The AMD 104 may be configured to dock or connect to the docking station 180. The docking station 180 may provide external power which the AMD 104 may use to charge a battery 114 of the AMD 104.

The AMD 104 may access one or more servers 182 via the network 184. For example, the AMD 104 may utilize a wakeword detection module to determine if the user 106 is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user 106 to one or more servers 182 for further processing. The servers 182 may process the spoken audio and return to the AMD 104 data that may be subsequently used to operate the AMD 104.

The AMD 104 may also communicate with other devices 186. The other devices 186 may include one or more devices that are within the physical space 102 such as a home or associated with operation of one or more devices in the physical space 102. For example, the other devices 186 may include a doorbell camera, a garage door opener, a refrigerator, washing machine, and so forth. In some implementations the other devices 186 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

Figure 2:
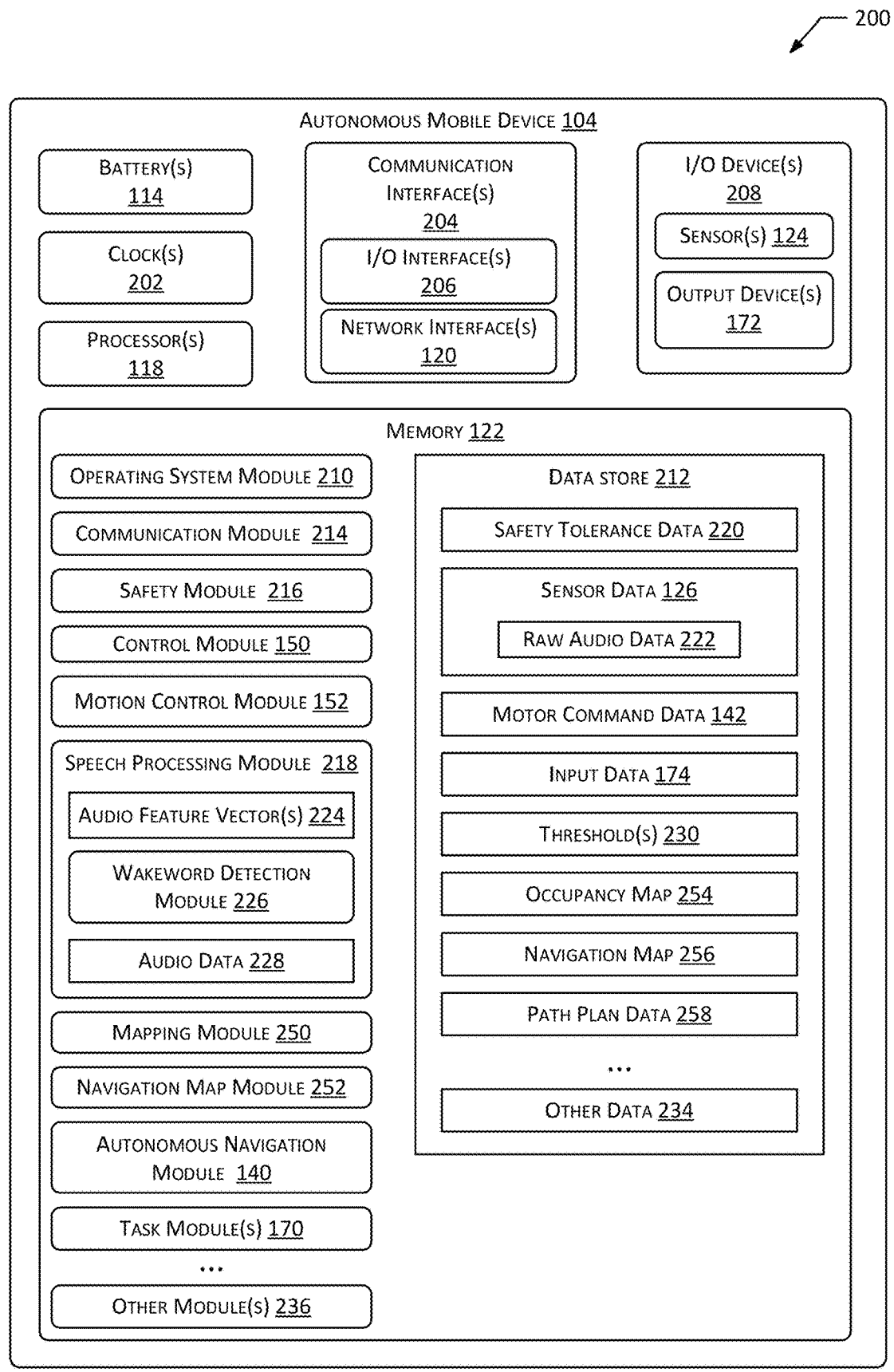
FIG. 2 is a block diagram of the components of the AMD, according to some implementations.

FIG. 2 is a block diagram 200 of the AMD 104, according to some implementations. The AMD 104 may include one or more batteries 114 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more clocks 202 may provide information indicative of date, time, ticks, and so forth. For example, the processor 118 may use data from the clock 202 to associate a particular time with an action, sensor data 126, and so forth.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more communication interfaces 204 such as input/output (I/O) interfaces 206, network interfaces 120, and so forth. The communication interfaces 204 enable the AMD 104, or components thereof, to communicate with other devices 186 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 124, keyboard, mouse, scanner, and so forth. The I/O devices 208 may also include output devices 172 such as one or more of a motor 116, light, speaker, display, projector, printer, and so forth. In some embodiments, the I/O devices 208 may be physically incorporated with the AMD 104 or may be externally placed.

The network interfaces 120 may be configured to provide communications between the AMD 104 and other devices 186 such as other AMDs 104, docking stations 180, routers, access points, and so forth. The network interfaces 120 may include devices configured to couple to personal area networks (PANS), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth. The AMD 104 may also include one or more busses or other internal communications hardware or software that allow for the transfer of data between the various modules and components of the AMD 104.

As shown in FIG. 2, the AMD 104 includes one or more memories 122. The memory 122 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 122 provides storage of computer-readable instructions, data structures, program modules, and other data for the operation of the AMD 104. A few example functional modules are shown stored in the memory 122, although the same functionality may alternatively be implemented in hardware, firmware, or as a system on a chip (SoC).

The memory 122 may include at least one operating system (OS) module 210. The OS module 210 is configured to manage hardware resource devices such as the I/O interfaces 206, the I/O devices 208, the communication interfaces 204, and provide various services to applications or modules executing on the processors 118. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS) as promulgated at www.ros.org, and so forth.

Also stored in the memory 122 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 186 including other AMDs 104, servers 182, network attached storage devices, and so forth.

A communication module 214 may be configured to establish communication with other devices 186, such as other AMDs 104, an external server 182, a docking station 180, and so forth. The communications may be authenticated, encrypted, and so forth.

Other modules within the memory 122 may include a safety module 216, the control module 150, the motion control module 152, a speech processing module 218, a mapping module 250, a navigation map module 252, the autonomous navigation module 140, the one or more task modules 170, or other modules 236. The modules may access data stored within the data store 212, including safety tolerance data 220, sensor data 126, other data 234, and so forth.

One or more of the control module 150 or the motion control module 152 may be implemented as hardware, software, or a combination thereof. In some implementations, one or more of the control module 150 or the motion control module 152 may be implemented as microcontrollers executing instructions. For example, the control module 150 may comprise a first microcontroller while the motion control module 152 comprises a second microcontroller. In another example, the functions of the control module 150 and the motion control module 152 may be performed by a single microcontroller, processor, system on a chip, field-programmable gate array (FPGA), application specific integrated circuit, and so forth.

The safety module 216 may access the safety tolerance data 220 to determine within what tolerances the AMD 104 may operate safely within the physical space 102. For example, the safety module 216 may be configured to stop the AMD 104 from moving when an extensible mast of the AMD 104 is extended. In another example, the safety tolerance data 220 may specify a minimum sound threshold which, when exceeded, stops all movement of the AMD 104. Continuing this example, detection of sound such as a human yell would stop the AMD 104. In another example, the safety module 216 may access safety tolerance data 220 that specifies a minimum distance from an object that the AMD 104 is to maintain. Continuing this example, when a sensor 124 detects an object has approached to less than the minimum distance, all movement of the AMD 104 may be stopped. Movement of the AMD 104 may be stopped by one or more of inhibiting operations of one or more of the motors 116, issuing a command to stop motor operation, disconnecting power from one or more the motors 116, and so forth. The safety module 216 may be implemented as hardware, software, or a combination thereof.

The safety module 216 may control other factors, such as a maximum speed of the AMD 104 based on information obtained by the sensors 124, precision and accuracy of the sensor data 126, and so forth. For example, detection of an object by an optical sensor may include some error, such as when the distance to an object comprises a weighted average between the object and a background. As a result, the maximum speed permitted by the safety module 216 may be based on one or more factors such as the weight of the AMD 104, nature of the floor, distance to the object, and so forth. In the event that the maximum permissible speed differs from the maximum speed permitted by the safety module 216, the lesser speed may be utilized.

The navigation map module 252 uses the occupancy map 254 as input to generate the navigation map 256. The navigation map module 252 may produce the navigation map 256 to inflate or enlarge the obstacles indicated by the occupancy map 254. One or more inflation parameters may be used during operation. The inflation parameters provide information such as inflation distance, inflation adjustment values, and so forth. In some implementations the inflation parameters may be based at least in part on the sensor FOV, sensor blind spot, physical dimensions of the AMD 104, and so forth.

The speech processing module 218 may be used to process utterances of the user 106. Microphones may acquire audio in the presence of the AMD 104 and may send raw audio data 222 to an acoustic front end (AFE). The AFE may transform the raw audio data 222 (for example, a single-channel, 16-bit audio stream sampled at 16 kHz), captured by the microphone, into audio feature vectors 224 that may ultimately be used for processing by various components, such as a wakeword detection module 226, speech recognition engine, or other components. The AFE may reduce noise in the raw audio data 222. The AFE may also perform acoustic echo cancellation (AEC) or other operations to account for output audio data that may be sent to a speaker of the AMD 104 for output. For example, the AMD 104 may be playing music or other audio that is being received from a network 184 in the form of output audio data. To avoid the output audio interfering with the device's ability to detect and process input audio, the AFE or other component may perform echo cancellation to remove the output audio data from the input raw audio data 222, or other operations.

The AFE may divide the raw audio data 222 into frames representing time intervals for which the AFE determines a number of values (i.e., features) representing qualities of the raw audio data 222, along with a set of those values (i.e., a feature vector or audio feature vector 224) representing features/qualities of the raw audio data 222 within each frame. A frame may be a certain period of time, for example a sliding window of 25 milliseconds (ms) of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 222, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 222) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user 106 intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 222 or the audio feature vectors 224) to one or more server(s) 170 for speech processing. The audio data 228 corresponding to audio obtained by the microphone may be processed locally on one or more of the processors 118, sent to a server 182 for routing to a recipient device or may be sent to the server 182 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by the navigation map module 252, prior to sending to the server 182, and so forth.

The speech processing module 218 may include or access an automated speech recognition (ASR) module. The ASR module may accept as input raw audio data 222, audio feature vectors 224, or other sensor data 126 and so forth and may produce as output the input data 174 comprising a text string or other data representation. The input data 174 comprising the text string or other data representation may be processed by the navigation map module 252 to determine the command to be executed. For example, the utterance of the command "robot, come here" may result in input data 174 comprising the text string "come here". The wakeword "robot" may be omitted from the input data 174.

A mapping module 250 determines a representation of the physical space 102 that includes the obstacles and their locations in the physical space 102. During operation, the mapping module 250 uses the sensor data 126 from various sensors 124 to determine information such as where the AMD 104 is, how far the AMD 104 has moved, the presence of obstacles, where those obstacles are, and so forth.

The mapping module 250 may use a simultaneous localization and mapping (SLAM) module and may provide data used to determine an occupancy map 254. Localization is determining where the AMD 104 is in the physical space 102, and may utilize some external reference. For example, cameras may acquire images. These images are processed to determine the presence of features in the images, such as edges of doors, shadows on the wall, texture on the walls, and so forth. The output may comprise a pose that is indicative of a location in the physical space 102 and orientation in that physical space 102.

The occupancy map 254 may comprise data that indicates the location of one or more obstacles, such as a table, wall, stairwell, and so forth. In some implementations, the occupancy map 254 may comprise a plurality of cells with each cell of the plurality of cells representing a particular area in the physical space 102. Data, such as occupancy values, may be stored that indicates whether an area of the physical space 102 associated with the cell is unobserved, occupied by an obstacle, or is unoccupied. An obstacle may comprise an object or feature that prevents or impairs traversal by the AMD 104. For example, an obstacle may comprise a wall, stairwell, and so forth.

While the AMD 104 is moving, the SLAM module may provide as output a series of poses, each pose describing a location and rotations in the physical space 102. Each pose is based at least in part on the apparent motion of observed features in the images. For example, from image to image at least some of the features that are described by descriptors will be in common. By determining the relative difference in apparent position in the image of the same feature as observed by two different cameras at the same time, the location of the camera with respect to the feature in the physical space 102 may be determined. During successive times, as the AMD 104 moves and additional images are acquired from locations in the physical space 102, the apparent change in position of the same feature across the additional images may be used to determine subsequent poses. In some implementations a pose may comprise information about six dimensions (6D), that of three orthogonal axes and corresponding rotations about those axes.

The SLAM module may also use data from other sensors 124 such as motor encoders, inertial measurement units (IMU) with one or more accelerometers and gyroscopes, and so forth. For example, inertial data indicative of rotations, accelerations along particular axes, and so forth obtained from the IMU may be integrated to provide information about the movement of the AMD 104.

A set of poses generated by the SLAM module over time describe the trajectory. For example, trajectory data may comprise a time series of pose data from the SLAM module.

A navigation map module 252 uses the occupancy map 254 as input to generate a navigation map 256. For example, the navigation map module 252 may produce the navigation map 256 by inflating or enlarging the apparent size of obstacles as indicated by the occupancy map 254.

The autonomous navigation module 140 provides the AMD 104 with the ability to navigate within the physical space 102 without real-time human interaction. The autonomous navigation module 140 may implement, or operate in conjunction with, the mapping module 250 to determine the occupancy map 254, the navigation map 256, or other representation of the physical space 102. In one implementation, the mapping module 250 may use one or more simultaneous localization and mapping ("SLAM") techniques. The SLAM algorithms may utilize one or more of maps, algorithms, beacons, or other techniques to navigate. The autonomous navigation module 140 may use the navigation map 256 to determine a set of possible paths along which the AMD 104 may move. One of these may be selected and used to determine path plan data 258 indicative of a path. For example, a possible path that is the shortest or has the fewest turns may be selected and used to determine the path. The path is then subsequently used to determine the motor command data 142 indicative of a set of commands that drive the motors 116 connected to the wheels. For example, the autonomous navigation module 140 may determine the current location within the physical space 102 and determine path plan data 258 that describes the path to a destination location such as the docking station 180.

The autonomous navigation module 140 may utilize various techniques during processing of sensor data 126. For example, image data obtained from cameras on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 118, in response to a command received from one or more communication interfaces 204, as determined from the sensor data 126, and so forth. For example, an external server 182 may send a command that is received using the network interface 120. This command may direct the AMD 104 to proceed to find a particular user 106, follow a particular user 106, and so forth. The AMD 104 may then process this command and use the autonomous navigation module 140 to determine the directions and distances associated with carrying out the command. For example, the command to "come here" may result in the task module 170 sending a command to the autonomous navigation module 140 to move the AMD 104 to a particular location near the user 106 and orient the AMD 104 in a particular direction.

The AMD 104 may connect to the network 184 using one or more of the network interfaces 120. In some implementations, one or more of the modules or other functions described here may execute on the processors 118 of the AMD 104, on the server 182, or a combination thereof. For example, one or more servers 182 may provide various functions, such as ASR, natural language understanding (NLU), providing content such as audio or video to the AMD 104, and so forth.

The other modules 236 may provide other functionality, such as object recognition, speech synthesis, user identification, and so forth. The other modules 236 may comprise a speech synthesis module that is able to convert text data to human speech. For example, the speech synthesis module may be used by the AMD 104 to provide speech that a user 106 is able to understand.

The data store 212 may store the other data 234 as well. For example, localization settings may indicate local preferences such as language, user identifier data may be stored that allows for identification of a particular user 106, and so forth.

Figure 3:
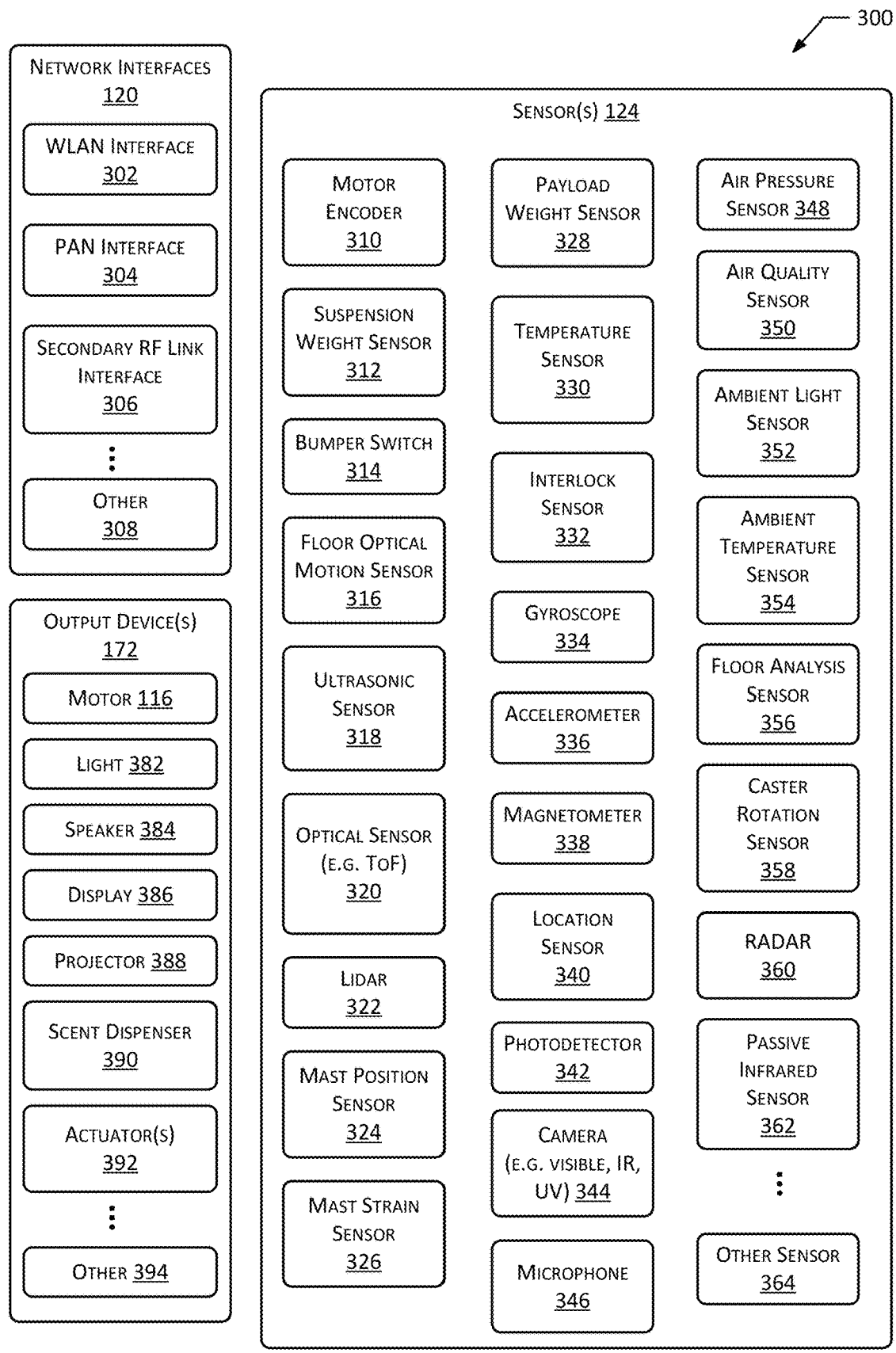
FIG. 3 is a block diagram of some components of the AMD, such as network interfaces, sensors, and output devices, according to some implementations.

FIG. 3 is a block diagram 300 of some components of the AMD 104 such as network interfaces 120, sensors 124, and output devices 172, according to some implementations. The components illustrated here are provided by way of illustration and not necessarily as a limitation. For example, the AMD 104 may utilize a subset of the particular network interfaces 120, output devices 172, or sensors 124 depicted here, or may utilize components not pictured. One or more of the sensors 124, output devices 172, or a combination thereof may be included on a moveable component that may be panned, tilted, rotated, or any combination thereof with respect to a chassis of the AMD 104.

The network interfaces 120 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 186 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, docking station 180, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 4G, LTE, 5G, or other standards.

The AMD 104 may include one or more of the following sensors 124. The sensors 124 depicted here are provided by way of illustration and not necessarily as a limitation. It is understood that other sensors 124 may be included or utilized by the AMD 104, while some sensors 124 may be omitted in some configurations.

A motor encoder 310 provides information indicative of the rotation or linear extension of a motor 116. The motor 116 may comprise a rotary motor, or a linear actuator. In some implementations, the motor encoder 310 may comprise a separate assembly such as a photodiode and encoder wheel that is affixed to the motor 116. In some implementations, the motor encoder 310 may comprise circuitry configured to drive the motor 116. The autonomous navigation module 140 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 116. For example, if the suspension weight sensor 312 indicates no weight on the suspension, the implication is that the AMD 104 is no longer resting on its wheels, and thus operation of the motors 116 may be inhibited. In another example, if the suspension weight sensor 312 indicates weight that exceeds a threshold value, the implication is that something heavy is resting on the AMD 104 and thus operation of the motors 116 may be inhibited. For example, the threshold value may comprise a weight of a load that compresses a suspension system to a minimum height, or results in a mass that exceeds a torque output of the motors 116 to maintain a minimum acceleration.

One or more bumper switches 314 provide an indication of physical contact between a bumper or other member that is in mechanical contact with the bumper switch 314. The safety module 216 utilizes sensor data 126 obtained by the bumper switches 314 to modify the operation of the AMD 104. For example, if the bumper switch 314 associated with a front of the AMD 104 is triggered, the safety module 216 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 124 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 126 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 124 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 140 may utilize the sensor data 126 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 126 may be generated that is indicative of the presence of objects and the relative positions, shapes, and so forth that are visible to the lidar 322. Data from the lidar 322 may be used by various modules. For example, the autonomous navigation module 140 may utilize point cloud data generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a side-load applied to the mast or a weight on the mast or downward pressure on the mast. The safety module 216 may utilize sensor data 126 obtained by the mast strain sensor 326. For example, if the strain applied to the mast exceeds a threshold amount, the safety module 216 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 114, one or more motors 116, and so forth. In the event the temperature exceeds a threshold value, the component associated with that device temperature sensor 330 may be shut down. For example, the threshold value may be determined based on component specifications, such as a maximum permissible temperature of the batteries 114.

One or more interlock sensors 332 may provide data to the safety module 216 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 126 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 126 indicative of impinging light. For example, the photodetector 342 may provide data indicative of a color, intensity, duration, and so forth.

A camera 344 generates sensor data 126 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data acquired by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 126 comprising images being sent to the autonomous navigation module 140. In another example, the camera 344 may comprise a 10 megapixel or greater camera that is used for videoconferencing or for acquiring pictures for the user 106.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 140 may be acquired using a rolling shutter and subsequently may be processed to mitigate image artifacts.

One or more microphones 346 may be configured to acquire information indicative of sound present in the physical space 102. In some implementations, arrays of microphones 346 may be used. These arrays may implement beamforming techniques to provide for directionality of gain. The AMD 104 may use the one or more microphones 346 to acquire information from acoustic tags, accept voice input from users 106, determine a direction of an utterance, determine ambient noise levels, for voice communication with another user 106 or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 140, the task module 170, and so forth. For example, if the floor analysis sensor 356 determines that the floor is wet, the safety module 216 may decrease the speed of the AMD 104 and generate a notification alerting the user 106.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 124 may include a radar 360. The radar 360 may be used to provide information as to a distance, lateral position, and so forth, to an object.

The sensors 124 may include a passive infrared (PIR) sensor 362. The PIR 362 sensor may be used to detect the presence of users 106, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 140. One or more touch sensors may be utilized to determine contact with a user 106 or other objects.

The AMD 104 may include one or more output devices 172. A motor 116 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. An actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user 106. Continuing the example, a motor 116 with an eccentric weight may be used to create a buzz or vibration to allow the AMD 104 to simulate the purr of a cat.

Figure 4:
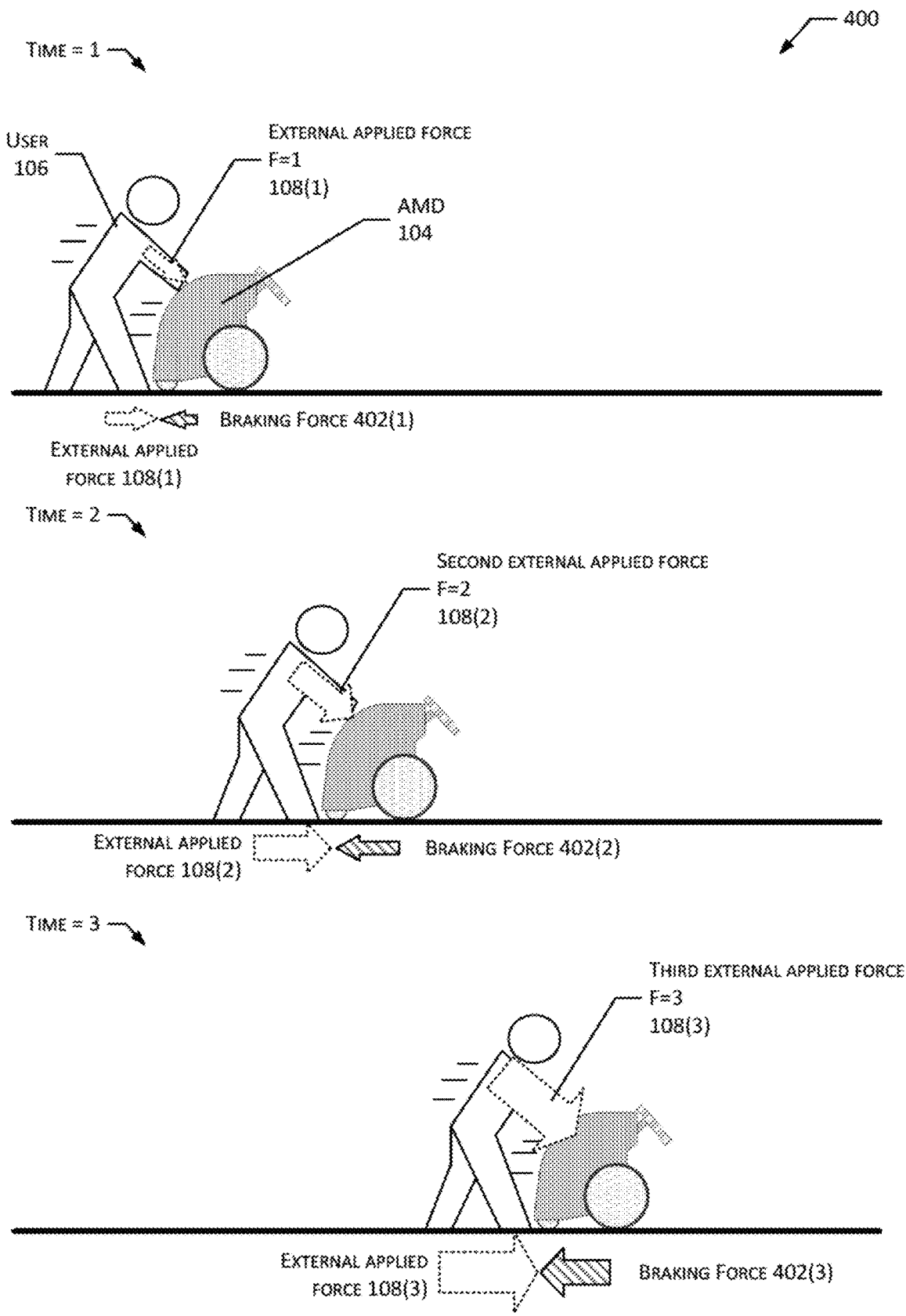
FIG. 4 illustrates an AMD that constrains the resulting motion while being repositioned by an external applied force provided by a user, according to some implementations.

FIG. 4 illustrates at 400 an AMD 104 that constrains the resulting motion while being repositioned by an external applied force 108 provided by a user 106, according to some implementations. The motion control module 152, or a portion thereof such as the motion constraint module 156, may constrain the movement of the AMD 104 responsive to the external applied force 108. This constraint may involve actuation of a braking system of the AMD 104, operating one or more motors 116 to provide torque in a direction opposite the direction of motion of the motor 116 that is produced by the external applied force 108, and so forth.

At time=1, the user 106 is applying external applied force 108(1) to the AMD 104 with a first magnitude F=1. This external applied force 108(1) causes the AMD 104 to begin moving. The motion control module 152 may detect the external applied force 108(1) as movement exceeding a velocity or motion threshold, and transitions the AMD 104 from the first mode to the second mode. Upon transitioning to the second mode, an initial braking force 402(1) may be applied to prevent the AMD 104 from freewheeling. For example, the motion control module 152 may determine braking data 158 comprising instructions to apply a minimum level of braking force to the AMD 104.

At time=2, the user 106 has increased the magnitude of the external applied force 108(2) with a second magnitude F=2 that is greater than F=1. If no action was taken, the AMD 104 would move faster. Responsive to the increase in velocity, braking force 402(2) is applied. The braking force 402(2) impedes or slows the movement of the AMD 104 but does not necessarily prevent it. For example, the motion control module 152 may determine braking data 158 comprising instructions to slow the AMD 104 but not bring the AMD 104 to a stop.

At time=3, the user 106 has increased the magnitude of the external applied force 108(3) with a third magnitude F=3 that is greater than F=2, pushing even harder on the AMD 104. This causes the AMD 104 to move faster, but responsive to this, a braking force 402(3) is applied that is even greater than the braking force 402(2). The braking force 402(3) impedes or slows the movement of the AMD 104 but does not necessarily prevent it.

In other words, as the AMD 104 is pushed and moves faster, the braking force 402 increases to limit further acceleration. The proportionality of velocity to braking force 402 may be one or more of linear, logarithmic, a step function, and so forth. While the examples herein are associated with a push, it is understood that a pull or other external applied force 108 may be used instead of, or with a push.

Figure 5:
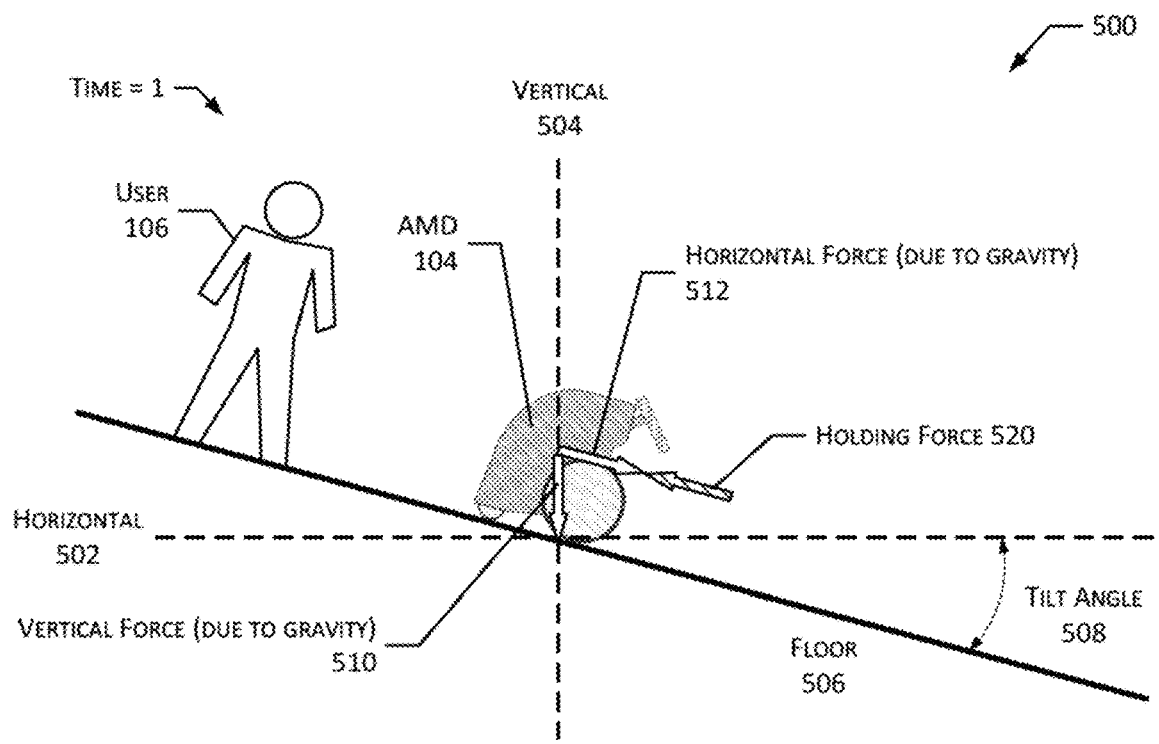
FIG. 5 illustrates an AMD on a tilted surface that is repositioned by an external force applied by a user, according to some implementations.
Figure 5:
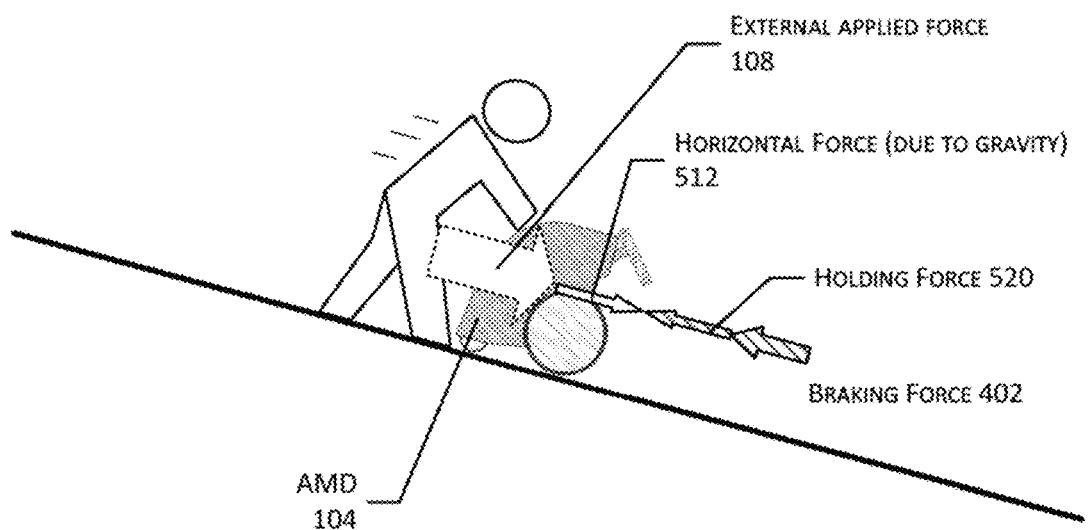

FIG. 5 illustrates an AMD 104 on a tilted surface that is repositioned by an external applied force 108 from a user 106, according to some implementations. In this illustration local horizontal 502 and vertical 504 are shown. For example, vertical 504 may be defined with respect to gravitational acceleration, while the horizontal 502 is indicative of a plane that is orthogonal to vertical 504. A floor 506 is shown that is not horizontal, being tilted at a tilt angle 508.

Gravity pulls down on the AMD 104 on the tilted floor 506, resulting in a vertical force 510 and a horizontal force 512. If left unchecked, the horizontal force 512 may result in the AMD 104 rolling downhill. A holding force 520 may be applied to keep the AMD 104 in place. For example, while in the first mode, the control module 150 operates the motor 116 to maintain the holding force 520. At time t=1, the AMD 104 maintains a particular pose in the physical space 102, with the holding force 520 keeping the AMD 104 stationary until additional commands are received. At time t=1 the mode data 154 may be indicative of the first mode.

At time t=2 the user 106 is now applying the external applied force 108 to the AMD 104. As shown here, the external applied force 108 has begun to move the AMD 104, overcoming the holding force 520. As described with regard to FIG. 4, a braking force 402 may also be applied to constrain movement of the AMD 104. The braking force 402 and the holding force 520 are illustrated as separate forces for illustration and not necessarily as a limitation. For example, the braking force 402 and the holding force 520 may both be provided simultaneously by applying braking to the motor 116, driving the motor 116 to produce a torque opposite a direction of motion, and so forth.

Figure 6:
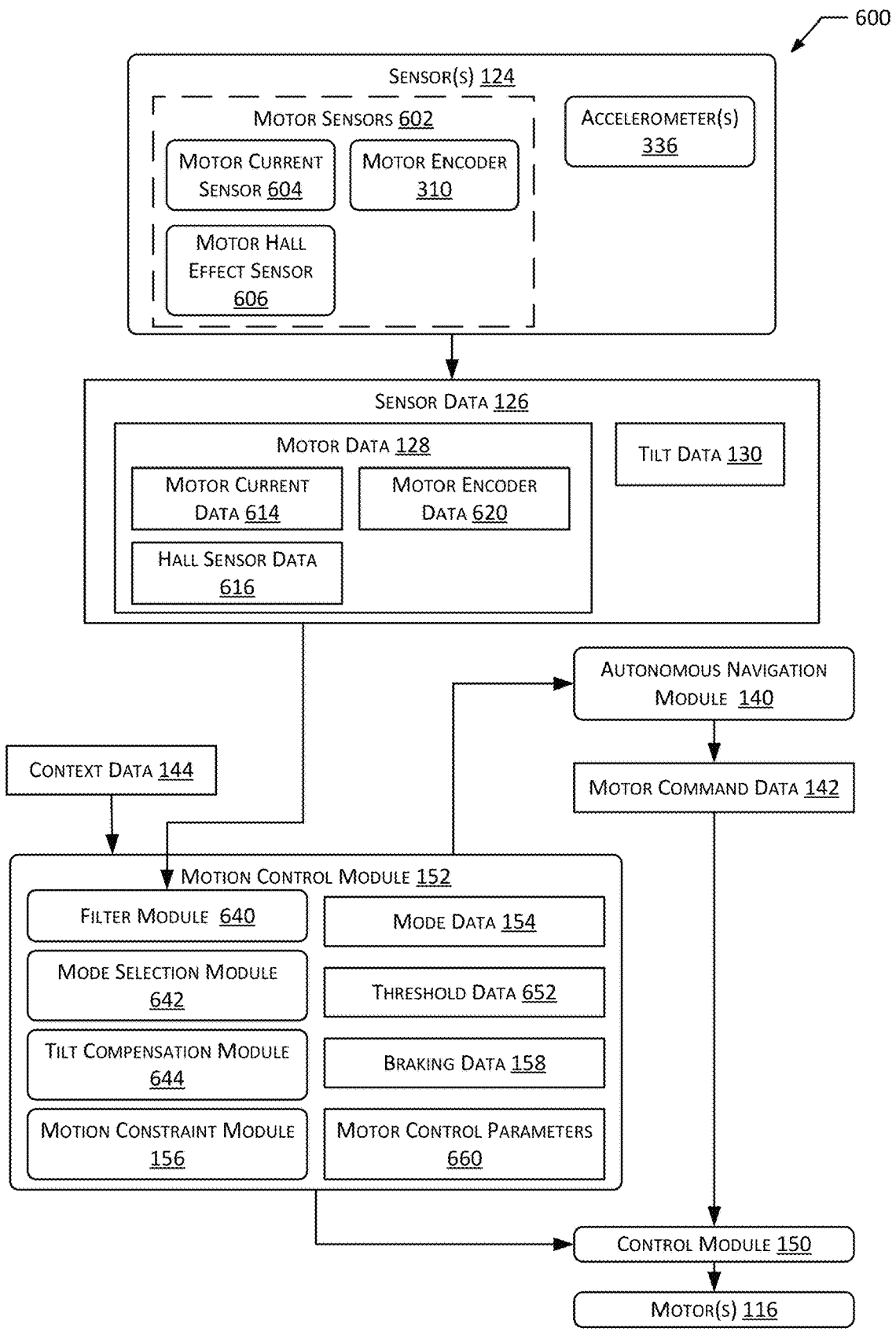
FIG. 6 is a block diagram of a motion control module of the AMD, according to some implementations.

FIG. 6 is a block diagram 600 of the motion control module 152 of the AMD 104, according to some implementations.

As described earlier, one or more sensors 124 may provide sensor data 126 to the motion control module 152. These sensors 124 may include one or more motor sensors 602 such as a motor current sensor 604, a motor Hall effect sensor 606, a motor encoder 310, and so forth. The motor current sensor 604 may comprise circuitry to measure electrical current sent to the motor 116, generated by the motor 116, or both. In some implementations, the motor current sensor 604 may be incorporated into the control module 150. The motor Hall effect sensor 606 may comprise one or more Hall effect devices associated with the motor 116 that provide information about movement of a portion of the motor. For example, the motor Hall effect sensor 606 may comprise part of the circuitry of a brushless direct current (BLDC) motor 116.

The sensor data 126 may comprise the motor data 128 that is, or is based on output from, one or more of the motor sensors 602. For example, the motor current sensor 604 may provide as output motor current data 614 that is indicative of current generated by the motor 116 resulting from an external force rotating the axle. In another example, the motor Hall effect sensor(s) 606 may provide Hall sensor data 616 that is indicative of rotation of an axle of the motor 116. In yet another example, the motor encoder 310 may provide motor encoder data 620 that is indicative of rotation of the axle of the motor 116.

The sensors 124 may include one or more accelerometers 336. For example, the accelerometers 336 may comprise an inertial measurement unit (IMU) that measures accelerations with respect to three orthogonal axes. The IMU may provide as output tilt data 130 that is indicative of the tilt angle 508 of the AMD 104 or a portion thereof, such as a display device.

The motion control module 152 may also accept the context data 144 as input. For example, the context data 144 may indicate that the AMD 104 is being used in a residence.

The motion control module 152 may include one or more filter modules 640. The filter modules 640 may process at least a portion of the sensor data 126 using an infinite impulse response (IIR) filter. For example, the motor current data 614 may be processed using an IIR. The mode selection module 642 uses the sensor data 126 as filtered by the filter module 640 (if present) to determine the mode data 154. For example, the mode selection module 642 may implement the equations below to determine whether the device is in the first mode, or is in a second mode while being subjected to an external applied force 108.

In one implementation, the mode selection module 642 may determine the presence of the external applied force 108 based at least in part on the motor data 128. For example, the AMD 104 may have a tricycle arrangement, with a left wheel driven by a left motor 116, a right wheel driven by a right motor 116, and a trailing caster wheel. If the motors 116 are not being commanded to move the AMD 104, application of a sufficient external applied force 108 will cause the AMD 104 to move. This movement will rotate one or both of the driven wheels. For example, if the external applied force 108 is applied from immediately behind the AMD 104 and is generally along a centerline of the AMD 104, the AMD 104 would be expected to move in a straight line. This would cause the left and right wheels, and the corresponding left and right motors 116, to rotate at approximately the same rate. In another example, a rotational external applied force 108 comprising the external applied force 108 being applied asymmetrically to a center of rotation (turning center) of the AMD 104, causes the AMD 104 to rotate, turning from a first orientation to a second orientation with respect to the physical space 102. In this example, the rotation of the left and right motors will differ. For example, one motor may rotate more than the other, or in an opposite direction.

The tilt compensation module 644 may be used to compensate for the tilt angle 508 indicated by the tilt data 130. As described with regard to FIG. 5, gravity will result in a horizontal force 512 that should not be interpreted as an external applied force 108 for the purposes of determining the mode data 154. The tilt compensation module 644 may implement a function, lookup table, or other mechanism to determine the horizontal force 512 and the expected effects of that horizontal force 512 on the motion of the AMD 104. For example, the tilt compensation module 644 may provide as output data indicative of an expected holding force 520 associated with maintaining the AMD 104 in a particular location on the floor 506 without sliding downhill.

While in the second mode, associated with external applied force 108 on the AMD 104, the motion constraint module 156 may determine braking data 158 that is indicative of the braking force 402 to be applied by the AMD 104. In one implementation, as the velocity of the AMD 104 increases, the braking force 402 may also be increased. The braking data 158 may also be determined based at least in part on the tilt compensation module 644. For example, the braking data 158 may be representative of a holding force 520 and a braking force 402.

The motion control module 152 may use threshold data 652 to specify one or more thresholds associated with determination of the transition from the first mode to the second mode, the second mode to the first mode, constraint values associated with the motion constraint module 156, and so forth. In one implementation, the transition between the first mode and second mode may have different thresholds for linear external applied forces 108 compared to rotational external applied forces 108. For example, a first threshold for external applied forces 108 that result in linear motion of the AMD 104 may be greater than a second threshold for external applied forces 108 that result in rotational motion of the AMD 104.

The motion control module 152 may determine one or more motor control parameters 660. For example, the motor control parameters 660 may be indicative of $K_p$ which is indicative of a value of resistance to change in velocity while $K_D$ is indicative of a damping value. In an analogous situation of spring motion, the value of $K_p$ is analogous to a stiffness of a spring while $K_D$ is the spring damping value. The motor control parameters 660 may be used during a transition mode between the first mode and the second mode to avoid jerking motion of the AMD 104.

In some implementations, the motion control module 152 may provide data to the autonomous navigation module 140. Operation of the autonomous navigation module 140 may be modified based on the data. For example, the motion control module 152 may send the mode data 154 to the autonomous navigation module 140. Continuing the example, while in the second mode, the autonomous navigation module 140 may suspend autonomous navigation and stop issuing motor command data 142 until the mode data 154 indicates the first mode.

The control module 150 may use the mode data 154 from the motion control module 152 to determine whether to disregard motor command data 142. For example, while in the first mode the control module 150 may receive motor command data 142 and operate the one or more motors 116 responsive to the commands therein. Continuing the example, while in the second mode, the control module 150 may receive motor command data 142 but does not operate the one or more motors 116 responsive to the commands therein. This prevents the AMD 104 from attempting to move while the user 106 is providing the external applied force 108.

The following expressions illustrate one implementation of the values and comparisons associated with transitions between the various modes of the motion control module 152 with respect to movement of a body of the AMD 104. For example, as the user 106 pushes the entire AMD 104 and then stops pushing.

The following expressions are used in the following equations to determine when the AMD 104 is in the first mode, and when to transition to another mode.

$v_{\{cmd\}}^{\{body\}}$ (Body Linear Speed) (Expression 1)

$\omega_{\{cmd\}}^{\{body\}}$ (Body Rotational Speed) (Expression 2)

$i_{\{measured\}}^{\{left\}}$ (Left drive wheel measured motor current) (Expression 3)

$i_{\{measured\}}^{\{right\}}$ (Right drive wheel measured motor current) (Expression 4)

The motion control module 152 may determine the first mode, the second mode, or a third mode. In the following equations MCM_MODE=0 corresponds to the first mode in which the control module 150 will be responsive to motor command data 142, such as from the autonomous navigation module 140. The MCM_MODE=1 corresponds to a third mode that is associated with a transition between the first mode and the second mode. The MCM_MODE=2 corresponds to the second mode in which the control module 150 disregards the motor command data 142 and the AMD 104 may be repositioned by the external applied force 108. Output from the motion control module 152 may be represented as the following expression:

$MCM_{ENTRY}, MCM_{MODE}=0$ (Expression 5)

By way of illustration, and not necessarily as a limitation, the following values may be specified for the various limits.

The motion thresholds or limits are specified as amperes, but in other implementations other units may be used. For example, if the motor encoder data 620 is used, the limits may be specified as radians per second.

$$i_{linearLimit}^{MCM}=0.5 Amp \quad \text{(Expression 6)}$$

$$i_{RotationalLimit}^{MCM}=0.25 Amp \quad \text{(Expression 7)}$$

During operation, the IIR implemented by the filter module 640 may use the values in the following expressions to filter the sensor data 126. For example, the motor current data 614 may comprise the $i_{measured}$ values that are then processed by the IIR to determine the $i_{measuredFiltered}$ values.

$$\text{filter}_{num}=0.992113166727292, -1.984226333454583,$$
$$0.992113166727292 \quad \text{(Expression 8)}$$

$$\text{filter}_{den}=1.0, -1.997979178418503,$$
$$0.997981488231737 \quad \text{(Expression 9)}$$

The motion control module 152 may determine if the AMD 104 is currently stationary, as described in the following expression.

$$\text{checkForMCM}=1 \text{ if } v_{upsamplerCmd}^{body}=0 \text{ and}$$
$$\omega_{upsamplerCmd}^{body}=0$$

0 otherwise (Expression 10)

The external applied force 108, depending upon how applied to the AMD 104, may result in a linear motion of the AMD 104, a rotational motion of the AMD 104, or a combination thereof. In some implementations different thresholds may be specified to transition between the first mode and the second mode if the external applied force 108 results in a linear motion or a rotational motion of the AMD 104. For example, it may take less force for the user 106 to rotate the AMD 104 than to push the AMD 104.

In the implementation where the AMD 104 utilizes left and right motors 116, a linear push may be determined as occurring when each motor is determined to be moving in the same direction. For example, a first value may be determined that indicates motion of the left motor 116 and a second value may be determined that indicates motion of the right motor 116. If the first value and the second value are indicative of the same direction of motion, such as both having the same sign, the motion may be deemed to be linear. In comparison, a rotational push may be determined based on the first value and second value being indicative of different directions of motion. For example, having opposite signs. The determination as to whether the external applied force 108 is a linear push or a rotational push may be determined using the following expression.

linearPush=1 if
$$i_{measuredFiltered}^{left} * i_{measuredFiltered}^{right} \geq 0 \quad \text{(Expression 11)}$$

The next expression may use this information to determine the MCM_ENTRY state, indicative of a transition from the first mode to another mode, such as a third mode.

MCM_ENTRY=1{if checkForMCM=1 and linear-
Push=1 and $\{i_{measuredFiltered}^{left}\}\geq i_{linearLimit}^{MCM}$
and $\{i_{measuredFiltered}^{right}\}\geq i_{linearLimit}^{MCM}\}$ 1{if checkForMCM=1 and linearPush=0 and
$\{i_{measuredFiltered}^{left}\}\geq i_{rotationalLimit}^{MCM}$ and
$\{i_{measuredFiltered}^{right}\}\geq i_{rotationalLimit}^{ABC}\}$ 0 otherwise where, $i_{measuredFiltered}^{left}$ and $i_{measuredFiltered}^{right}$ are the filtered measured motor current using the IIR Filter (Expression 12)

In some implementations a transition mode, or third mode, may be used to facilitate the change from the first mode to the second mode and avoid abrupt changes in commands provided to the motor(s) 116. The values associated with the third mode are as follows:

$K_p, K_d$ $$MCM_{MODE}=1 \quad \text{(Expression 13)}$$

In one implementation the values may be specified as follows:

$T_{transition}$(Transition time)=0.2 sec $$k_d^{transition}=0.12 \, Amp/\text{radPerSec} \quad \text{(Expression 14)}$$

$$K_p^{temp} = K_p^{nominal}\left(1 - \frac{\delta T}{T_{transition}}\right) \quad \text{(Expression 15)}$$

Where $\delta T$ is the time since transition into the third mode.

This results in a transition in proportional controller gain from nominal t 0 in the transition time. (Expression 16)

$$K_p=\max(K_p^{temp},0) \quad \text{(Expression 17)}$$

$$K_d=K_d^{transition} \quad \text{(Expression 18)}$$

When the MCM_TRANSITION has a value of 1, the system transitions to the second mode. The value of the MCM_TRANSITION may be determined as shown in the following expression:

MCM_TRANSITION=1 if $K_p=0$ 0 otherwise (Expression 19)

Once in the second mode, the AMD 104 may be moved by the external applied force 108, but that motion may be constrained according to the following expressions. When the motion is determined to cease, the system transitions to the first mode.

| | |
|---|---|
| $v_{measured}^{body}$ Measured body linear velocity | (Expression 20) |
| $\omega_{measured}^{body}$ Measured body rotational speed | (Expression 21) |
| $K_d$ (damping) | (Expression 22) |
| $MCM_{EXIT}$(Flag to exit back—driving) | (Expression 23) |
| $RESET_{UPSAMPLER}$(Flag to reset upsampler) | (Expression 24) |
| $MCM_{MODE}=2$ | (Expression 25) |
| $K_d^o=0.12Amp\text{\textbackslash radPerSec}$ | (Expression 26) |
| $k_d^m=0.24Amp\text{\textbackslash radPerSec}$ | (Expression 27) |
| $\omega_{wheel}^o=7.5\text{radPerSec}$ | (Expression 28) |

$\omega_{wheel}{}^{max}=10radPerSec$ (Expression 29)

$\omega_{wheel}{}^{exit}=0.1radPerSec$ (Expression 30)

While in the second mode, the motion control module 152 may determine when to exit the second mode, according to the following expressions.

$$K_d = \begin{array}{l} K_d^o \quad \text{if } \omega_{wheel} \leq \omega_{wheel} \\ K_d^o + K_d^m * \frac{\omega_{wheel1} @ -\omega_{wheel}^o}{\omega_{wheel}^{max} - \omega_{wheel}} \quad \text{otherwise} \end{array}$$ (Expression 31)

MCM_EXIT=1 if $\omega_{wheel}{}^{left} \leq \omega_{wheel}{}^{exit}$ and $\omega_{wheel}{}^{right} \leq \omega_{wheel}{}^{exit}$ 0 otherwise (Expression 32)

Reset upsampler when $MCM_{Exit}=1$. This sets the commanded position to the measured position and set the commanded velocity to 0. $Kp$ and $Kd$ are also set to their nominal values upon exiting this state.

RESET_UPSAMPLER=1 if $MCM$_EXIT=1

0 otherwise (Expression 33)

Upon exit from the second mode, the system returns to the first mode. During operation, the motion control module 152 is able to quickly detect the application of the external applied force 108 and allow the user 106 to safely move the AMD 104 manually. Once the external applied force 108 ceases, the AMD 104 may return quickly to normal operation, ready for autonomous navigation.

Figure 7:
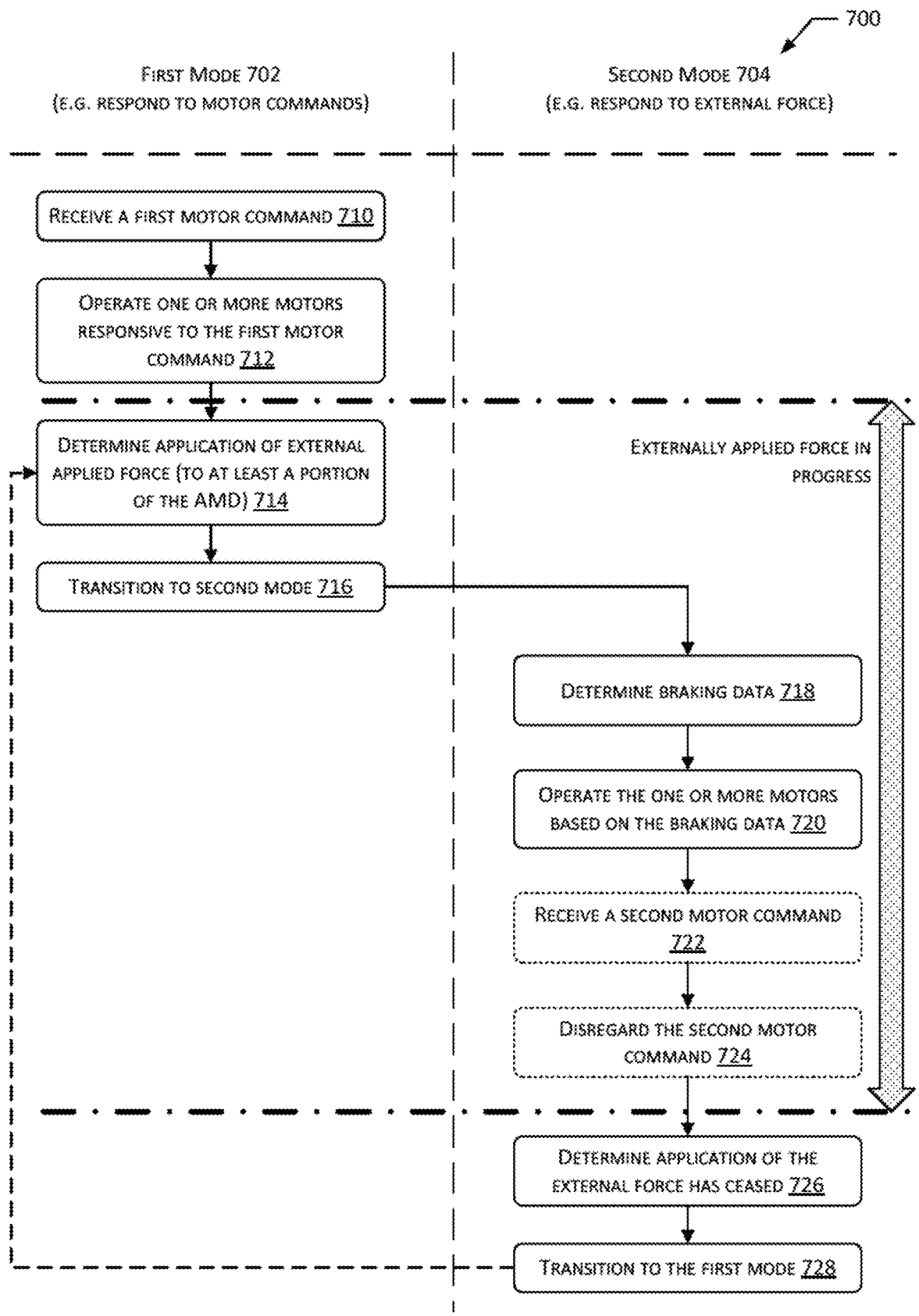
FIG. 7 is a flow diagram of a process to control motion of an AMD, according to some implementations.

FIG. 7 is a flow diagram 700 of a process to control motion of an AMD 104, according to some implementations. In some implementations, the process 700 may be implemented at least in part by the motion control module 152. In this figure, time increases down the page. For example, operations at the top of the page occur before operations at the bottom of the page. In other implementations, one or more of the operations described may be performed in an order that is different from that shown. The operations are shown associated with a first mode 702 on the left of the page and a second mode 704 on the right of the page. By way of illustration, and not necessarily as a limitation, the third mode comprising the transition between the first mode and the second mode is not shown.

At 710, a first motor command is received. For example, the control module 150 may receive motor command data 142 from the autonomous navigation module 140. In another example, the control module 150 may receive motor command data 142 from a remote control module, responsive to commands from an external operator.

At 712, one or more motors 116 are operated responsive to the first motor command. For example, the control module 150 may have previously received mode data 154 that indicates that the current mode data 154 from the motion control module 152 is indicative of the first mode.

After 712, the external applied force 108 is applied to the AMD 104, resulting in the movement of the AMD 104.

At 714, application of the external applied force 108 to at least a portion of the AMD 104 is determined. For example, the motor current data 614 may indicate the current from the left motor 116 and the current from the right motor 116 exceed a threshold current value.

At 716, responsive to the determination at 714, the system transitions to operate in the second mode. For example, the motion control module 152 may determine updated mode data 154 indicative of the second mode, and send that updated mode data 154 to the control module 150.

At 718, now in the second mode 704, braking data 158 may be determined. In one implementation the braking data 158 may be determined responsive to output from the tilt compensation module 644, the motion constraint module 156, and so forth. For example, the braking data 158 may be indicative of the holding force 520 to be applied to prevent the AMD 104 from rolling downhill. Continuing the example, the braking data 158 may be indicative of the braking force 402 to be applied to limit movement of the AMD 104.

The braking data 158 may be indicative of an initial level of braking to be applied to the one or more motors 116. This prevents the motors 116 from freewheeling and provides some resistance to motion that results in motion of the AMD 104 ceasing shortly after the external applied force 108 is removed.

At 720 one or more of the motors 116 may be operated based on the braking data 158. For example, the braking data 158 may comprise instructions to connect an electrical resistor across terminals of the motor 116, to operate the motors with specified torque in a direction opposite the motion imposed by the external applied force 108, and so forth.

In the implementation shown, at 722 a second motor command is received. For example, the autonomous navigation module 140 may send second motor command data 142 indicative of instructions to move the AMD 104 to a different pose. In some implementations, the second motor command data 142 may be omitted. For example, the first motor command data 142 may specify a set of commands to be completed over some time, and the control module 150 may continue to execute these commands.

In the event that second motor command data 142 is received while in the second mode 704, at 724 the second motor command is disregarded. For example, the control module 150 may determine that the current state is the second mode 704, and does not execute the second motor command data 142. Returning to the earlier example, execution of previously received motor command data 142 may cease at 720.

At 726 a determination is made that the external applied force 108 has ceased. For example, the motor current data 614 may indicate that that the motor current produced due to external motion has dropped below a second threshold value.

At 728, the system transitions from the second mode 704 to the first mode 702, and the process may return to 714.

The techniques described herein may be applied to other actuators associated with the AMD 104. For example, one or more motors 116 may move a display 386, camera 344, or other portion of the AMD 104. Continuing the example, one or more motors 116 may be used to pan the display 386, to maintain a particular orientation with respect to the user 106. The techniques described herein may be applied to these other motors 116. Continuing the example, the user 106 may apply an external applied force 108 to manually pan the display 386 to a preferred angle relative to the body of the AMD 104. While that external applied force 108 is pushing the display 386, the motor 116 may be transitioned to the second mode 704. Once the user 106 stops pushing, the motor 116 may be transitioned back to the first mode 702 and resume panning automatically.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD) comprising:
a first motor;
a second motor;
a controller connected to the first motor and the second motor;
one or more processors to execute computer-executable instructions to:
 determine one or more motor commands to maintain a first pose of the AMD in a physical space; and
 send the one or more motor commands to the controller; and
the controller to:
 operate, at a first time, in a first mode, wherein the controller operates one or more of the first motor or the second motor responsive to the one or more motor commands received from the one or more processors;
 determine, at a second time, application of an external force to the AMD;
 operate, at a third time, in a second mode, wherein the controller:
  operates the one or more of the first motor or the second motor to apply a first braking force, and
  disregards one or more motor commands received from the one or more processors;
 determine, at a fourth time, cessation of the external force; and
 operate, at a fifth time, in the first mode.

2. The AMD of claim 1, wherein the controller determines the cessation of the external force based at least in part on:
a first value indicative of motion of the first motor that is less than a first threshold value; and
a second value indicative of motion of the second motor that is less than a second threshold value.

3. The AMD of claim 1, further comprising:
a first current sensor, wherein the first current sensor generates a first value that is indicative of a first current produced by the first motor due to rotation of a portion of the first motor;
a second current sensor, wherein the second current sensor generates a second value that is indicative of a second current produced by the second motor due to rotation of a portion of the second motor; and
wherein the controller operates based on the first value and the second value.

4. The AMD of claim 1, further comprising the controller to:
determine a first value indicative of motion of the first motor;
determine a second value indicative of motion of the second motor;
determine, based on the first value, a third value that is indicative of a first torque, the first torque being in a direction opposite the motion of the first motor;
determine, based on the second value, a fourth value that is indicative of a second torque, the second torque being in a direction opposite the motion of the second motor; and
operate, while in the second mode:
 the first motor based on the first torque; and
 the second motor based on the second torque.

5. The AMD of claim 1, wherein the instructions to determine the application of the external force to the AMD are based at least in part on:
a first value indicative of motion of the first motor that is greater than a first threshold value; and
a second value indicative of motion of the second motor that is greater than a second threshold value; and
the AMD further comprising one or more of the controller or the one or more processors to execute instructions to determine one of:
based on the first value and the second value being indicative of a same direction of motion, a third value, wherein the first threshold value and the second threshold value are set to the third value; or based on the first value and the second value being indicative of different directions of motion, a fourth value, wherein the first threshold value and the second threshold value are set to the fourth value and further wherein the fourth value is less than the third value.

6. The AMD of claim 1, further comprising:
a sensor, wherein the sensor provides sensor data indicative of a tilt of at least a portion of the AMD relative to vertical; and
the controller to further:
determine, based at least in part on the sensor data, a first threshold value associated with movement of the first motor and a second threshold value associated with movement of the second motor, wherein the first threshold value and the second threshold value are proportionate to the tilt.

7. The AMD of claim 1, further comprising the one or more processors to execute the computer-executable instructions to:
determine first data indicative of one or more of:
a presence of a person in a vicinity of the AMD,
a count of persons in the vicinity of the AMD,
a presence of a pet in the vicinity of the AMD,
a type of location associated with the physical space, or
a type of task being performed by the AMD; and
provide the first data to the controller; and
the controller further to:
determine, based at least in part on the first data, a first threshold value associated with movement of the first motor and a second threshold value associated with movement of the second motor.

8. A device comprising:
a first motor; and
a first processor coupled to the first motor;
wherein the first processor:
causes the device to operate in a first mode at a first time, wherein in the first mode, the device operates the first motor responsive to a first motor command;
determines application of an external force to at least a portion of the device at a second time; and
responsive to the application of the external force, causes the device to operate in a second mode at a third time, wherein in the second mode, the first motor is operated to apply a first braking force and to disregard a second motor command.

9. The device of claim 8, wherein the first processor further:
determines, at a fourth time, cessation of the external force based at least in part on a first value indicative of motion of the first motor that is less than a first threshold value; and
causes the device to operate in the first mode at a fifth time.

10. The device of claim 8, further comprising:
a first current sensor, wherein the first current sensor generates a first value that is indicative of a first current produced by the first motor due to rotation of a portion of the first motor; and
wherein the first processor further:
determines the external force based on the first value.

11. The device of claim 8, further comprising:
a first sensor, wherein the first sensor generates a first value that is indicative of rotation of a portion of the first motor; and
wherein the first processor further:
determines the external force based on the first value.

12. The device of claim 8, wherein the first processor further:
determines, based on a first value indicative of rotation of a portion of the first motor, a second value that is indicative of a second braking force to apply to the first motor; and
operates, while in the second mode:
the first motor based on the second value to produce the first braking force.

13. The device of claim 8, further comprising:
a sensor, wherein the sensor provides sensor data indicative of a tilt of at least a portion of the device relative to vertical; and
wherein the first processor further:
determines the first braking force based on the sensor data indicative of the tilt.

14. The device of claim 8, further comprising a second processor to execute computer-executable instructions to:
determine, as of the second time, first data indicative of one or more of:
presence of a person in a vicinity of the device,
count of persons in the vicinity of the device,
presence of a pet in the vicinity of the device,
type of location associated with a physical space, or
type of task being performed by the device;
provide the first data to the first processor; and
wherein the first processor further:
determines a first threshold value based at least in part on the first data; and
determines the application of the external force based at least in part on the first threshold value.

15. The device of claim 8, further comprising:
a second motor, wherein the first processor is connected to the second motor; and
wherein the first processor further:
determines, at the first time, that a first value indicative of motion of the first motor is greater than a first threshold value;
determines, at the second time, that a second value indicative of motion of the second motor is greater than a second threshold value; and
determines, at the second time, one of:
based on the first value and the second value being indicative of a same direction of rotation, a third value, wherein the first threshold value and the second threshold value are set to the third value; or
based on the first value and the second value being indicative of opposing rotation, a fourth value, wherein the first threshold value and the second threshold value are set to the fourth value and further wherein the fourth value is less than the third value.

16. A method comprising:
receiving, at a first time and by a device in a first mode, a first motor command, wherein in the first mode, the device operates one or more motors based on motor commands;
operating, at a second time, the one or more motors based on the first motor command;
determining, at a third time, first data indicative of a first external force applied to the one or more motors;

in response to the first data, transitioning the device from the first mode to a second mode; and applying, at a fourth time, a first braking force to the one or more motors.

17. The method of claim 16, the determining the first data comprising:

receiving, at a fifth time after the third time and by the device in the second mode, a second motor command, wherein the device in the second mode disregards the second motor command.

18. The method of claim 16, further comprising:

determining, at a fifth time, second data that is indicative of a second external force applied to the one or more motors;

in response to the second data, transitioning the device from the second mode to the first mode;

receiving, at a sixth time and by the device in the first mode, a second motor command; and based on the second data, operating at a seventh time the one or more motors based on the second motor command.

19. The method of claim 16, further comprising:

determining, based on the first data, second data that is indicative of the first braking force to apply to one or more of the one or more motors; and limiting motion of the one or more motors based on the second data.

20. The method of claim 16, further comprising:

acquiring sensor data that is indicative of a tilt of at least a portion of the device relative to vertical;

determining a first threshold value based at least in part on the sensor data, wherein the first threshold value is proportionate to the tilt; and wherein the determining the first data is based at least in part on the first threshold value.

* * * * *